(12) United States Patent
Harmala

(10) Patent No.: US 8,202,407 B1
(45) Date of Patent: Jun. 19, 2012

(54) APPARATUS AND METHOD FOR MANUFACTURING POLYCARBONATE SOLAR CELLS

(76) Inventor: Arthur Don Harmala, Saline, MI (US)

( * ) Notice: Subject to any disclaimer, the term of this patent is extended or adjusted under 35 U.S.C. 154(b) by 0 days.

(21) Appl. No.: 13/160,972

(22) Filed: Jun. 15, 2011

Related U.S. Application Data

(63) Continuation-in-part of application No. 12/647,080, filed on Dec. 24, 2009, now abandoned.

(60) Provisional application No. 61/142,724, filed on Jan. 6, 2009.

(51) Int. Cl.
*C23C 14/00* (2006.01)
*B28B 3/00* (2006.01)

(52) U.S. Cl. .................. 204/298.02; 425/406

(58) Field of Classification Search ............ 204/298.02; 425/542, 406
See application file for complete search history.

(56) References Cited

U.S. PATENT DOCUMENTS

| | | | |
|---|---|---|---|
| 4,465,575 A | 8/1984 | Love et al. | |
| 4,769,291 A | 9/1988 | Belkind et al. | |
| 4,798,660 A | 1/1989 | Ermer et al. | |
| 4,986,938 A | 1/1991 | Izuka et al. | |
| 5,403,663 A | 4/1995 | Sichmann et al. | |
| 5,417,899 A | 5/1995 | Kitamura | |
| 5,709,785 A | 1/1998 | LeBlanc, III et al. | |
| 6,080,288 A | 6/2000 | Schwartz et al. | |
| 6,113,749 A | 9/2000 | Kok et al. | |
| 6,177,168 B1 | 1/2001 | Stevens | |
| 6,518,086 B2 | 2/2003 | Beck et al. | |
| 2002/0015881 A1* | 2/2002 | Nakamura et al. | 429/111 |
| 2006/0065301 A1* | 3/2006 | Miyoshi | 136/263 |
| 2010/0055826 A1* | 3/2010 | Zhong et al. | 438/84 |

FOREIGN PATENT DOCUMENTS

WO  WO-2004089597 A1  10/2004

OTHER PUBLICATIONS

Birkmire et al., "Cu(InGa)Se2 Solar Cells on a Flexible Polymer Web", Institute of Energy Conversion, Mar. 2005, p. 190, 193. University of Delaware, Newark, DE 19716.

Eser et al., "Critical Issues for Cu(InGa)Se2 Solar Cells on Flexible Polymer Web", Sep. 2005, Institute of Energy Conversion, University of Delaware, Newark, DE 19716.

(Continued)

*Primary Examiner* — James Lin
(74) *Attorney, Agent, or Firm* — Jelic Patent Services, LLC; Stanley E. Jelic

(57) ABSTRACT

An apparatus and method for manufacturing polycarbonate solar cells. The apparatus is designed to adapt many techniques used in the compact disc manufacturing industry to the manufacture of polycarbonate solar cells. The apparatus comprises: means for creating a polycarbonate substrate for a solar cell with a molding machine; means for depositing a cathodic contact layer on the polycarbonate substrate; means for depositing in one-step by sputtering a quaternary Cu—In—Ga—Se photonic energy absorbing layer on the polycarbonate substrate; means for using a high intensity pulsed xenon flashlamp for rapid heat treatment to form a CIGS absorber layer; means for depositing a buffer layer on the polycarbonate substrate; means for depositing a highly resistive transmissive intrinsic layer with directed sputtering energy; means for depositing a transmissive contact layer on the polycarbonate substrate; means for adding anodic contacts to one of the layers; means for depositing an anti-reflective coating layer on the polycarbonate substrate; and means for encapsulating the solar cell to provide environmental protection.

4 Claims, 5 Drawing Sheets

OTHER PUBLICATIONS

Hoffman et al., "Thin-Film Photovoltaic Solar Array Parametric Assessment", NASA/TM-2000-210342, Jul. 2000, p. 6 (2) Glenn Research Center, Cleveland, Ohio, AIAA-2000-2919.

"Moldpro All Electric Injection Molding Machine", Mar. 2006, Singulus Molding, Kahl, Germany.

"Bayer Material Science AG Makrolon® CD 2005 Polycarbonate, Optical/Compact Disc Grade", Data sheet No. PBA459 / 26960, www.matweb.com.

"Substrates Background", iNEMI Substrate Flex Aug. 2008 paper by Mpoliks, Cornell University, The International Electronics Manufacturing Initiative (iNEMI).

"3M™ iM30K Hi-Strength Glass Bubbles", 0108, Energy and Advanced Materials Division 3M Center, Building 223-6S-04, St. Paul, MN 55144-1000; www.3M.com/paintsandcoatings, 2008.

Wada et al., "Physical Vapor Deposition of Cu(In,Ga)Se2 Films for Industrial Application", May 2001, ATRL, MRSSP, vol. 668.

Lübbehusen et al. "High Rate Aluminum Sputtering in Compact Disc Production", Vakuum in Forschung und Praxis (1995) Nr. 3 S. 194-200, Singulus Technologies, Germany.

Beich, "Injection Molded Polymer Optics in The 21st-Century", 2005, G-S Plastic Optics.

"Fresnel Lenses brochure FM6", Oct. 2003, Fresnel Technologies, Inc., Fort Worth, Texas, www.fresneltech.com.

Scofield et al., "Sputtered Molybdenum Bilayer Back Contact for Copper Indium Diselenide-Based Polycrystalline Thin-Film Solar Cells", May 1994, NREL, Golden, Colorado.

Kemell et al., "Thin Film Deposition Methods for CuInSe2 Solar Cells", Mar. 2005, 1-31pp, Critical Reviews in Solid State and Materials Sciences, 30:1.

Hariskos et al., "Buffer layers in Cu(In,Ga)Se2 solar cells and modules", Dec. 2004, 99-109pp.,Thin Solid Films 480-481 (2005).

Haug, "Development of Cu(In,Ga)Se2 Superstrate Thin Film Solar Cells", 2001, 14-16pp., A dissertation submitted to the Swiss Federal Institute of Technology, Zürich, Switzerland for the degree of Doctor of Natural Sciences, Diploma Physics University at Ulm, Switzerland, 2001.

Kushiya et al., "Formation Chemistry of Polycrystalline Cu(InGa)Se2 Thin-Film Absorbers Prepared by Selenization of Cu-Ga/In Stacked Precursor Layers with H2Se Gas", 2007. Material Research Society Symposium Proceedings, vol. 426, 2003.

Palm et al., Cu(In,Ga)(Se,S)2 Absorbers Formed by Rapid Thermal Processing of Elemental Precursors: Analysis of Thin Film Formation and Implementation of a Large Area, 2005 Industrial Process, 2003, Material Research Society Symposium Proc. vol. 763, B6.8.1, Shell Solar GmbH, RS/T-CIS, Otto Hahn Ring 6, D-81739 Munich, Germany.

Industrial Process, 2003, Material Research Society Symposium Proc. vol. 763, B6.8.1, Shell Solar GmbH, RS/T-CIS, Otto Hahn Ring 6, D-81739 Munich, Germany.

Matsubara et al., "Bandgap engineering of ZnO transparent conducting films", 2003, Mat. Res. Soc. Symp. Proc. vol. 763 © 2003 Materials Research Society B7.2.1.

"Translucent Conductive Ink 124-31", Revision Date: Jan. 2, 2007 Revision: B; Creative Materials, Inc., 141 Middlesex Road, Tyngsboro, MA 01879.

"DuPont Photovoltaic Encapsulants", Sep. 2008, Encapsulation Resins for Photovoltaics—DuPont EVA for PV, DuPont Corporation USA.

Ohl et al., "Increased Internal Quantum Efficiency of Encapsulated Solar Cells by Using Two-Component Silicone as Encapsulant Material", 2008,Valencia, Preprint 23rd EU PVSEC University of Konstanz, Department of Physics, Konstanz, Germany, 2008.

Binkowska et al., "Mass production of DVDs: faster, more complex but cheaper and simpler", Jun. 2006, Microsyst Technol (2007) 13: 139-144, DOI 10.1007/s00542-006-0159-2 Published online: Jun. 10, 2006,© Springer-Verlag 2006.

Takeda et al., Development of CD-Rc: 120 mm Recordable Optical Disc Compatible with CD and DVD Based on a Newly Developed Inorganic Thin Film Multilayered Optical, 2003 Memory, Sep. 2003, Research Report in Special Issue: New Thin Film Multilayered Systems for Recordable Optical Disc Memory Compatible with CD and DVD.

"Specifications for Skyline II CD/DVD 5 Replication System", No. 310103, revision Apr. 2004, Singulus Technologies AG, Kahl am Main, Germany.

"DVD Disc Manufacturing", Apr. 1999, Disctronics • Southwater Business Park • Southwater • West Sussex • RH13 7YT • England.

PCT International Search Report, 2010.

\* cited by examiner

APPARATUS AND METHOD FOR MANUFACTURING POLYCARBONATE SOLAR CELLS

CROSS-REFERENCE TO RELATED APPLICATIONS

This application is a continuation-in-part of application Ser. No. 12/647,080, filed Dec. 24, 2009, now abandoned which claims the benefit of U.S. Provisional Application 61/142,724 filed Jan. 6, 2009, both of which are incorporated by reference in their entirety.

BACKGROUND OF THE INVENTION

Solar cell manufacturing methods typically use either glass substrates, metal foil, or plastic film substrates. The foil or film substrates, also known as thin film solar, are made on roll-to-roll (R2R) systems. These R2R systems are conceptually similar to newspaper printing systems. Cu—In—Ga—Se (CIGS) solar cell technology has gained success on substrates that can tolerate the high temperatures required for absorber layer formation. The temperature required for formation of a CIGS absorber layer is up to 550° C.

BRIEF SUMMARY OF THE INVENTION

The present disclosure provides an apparatus and method for manufacturing polycarbonate solar cells. The apparatus is designed to adapt many techniques used in the compact disc manufacturing industry to the manufacture of polycarbonate solar cells. The apparatus comprises: means for creating a polycarbonate solar cell substrate by extrusion or molding machine with a micro-pit and land structure on one surface; means for depositing a cathodic contact layer on the polycarbonate substrate; means for depositing a photonic energy absorbing layer by sputtering on the polycarbonate substrate; means for using a high intensity pulsed xenon flashlamp for rapid heat treatment to form a CIGS absorber layer; means for depositing a buffer layer on the polycarbonate substrate; means for depositing by sputtering a highly resistive transmissive intrinsic layer; means for depositing a transmissive contact layer on the polycarbonate substrate; means for adding anodic contacts to one of the layers; means for depositing an anti-reflective coating layer on the polycarbonate substrate; and means for encapsulating the solar cell to provide environmental protection.

The apparatus and method also enable the use to add hollow borosilicate glass micro-spheres to be incorporated in the polycarbonate to lower the overall density of the solar cell. The lower density enables applications where the weight and strength of the solar cell is critical.

The apparatus and method are capable of manufacturing polycarbonate solar cells in any shape required. Examples of shapes include but are not limited to: circular, square, rectangular, trapezoidal, triangular, and oval.

A primary benefit of the invention is the ability to make molded substrates which employ a custom programmed micro-pit and land surface, or the like, feature on the absorber layer side. The micro-pit structure, or the like, feature can help to provide greater adhesion of the initial sputtered layer and enhances the ability for increased surface area for captured photonic energy absorption in the second copper indium gallium (di) selenide (CIGS) absorber layer. The polycarbonate substrate underside micro-pit structure will give the solar cell additional surface area, verses a flat surface, for higher photon absorption capability.

Another primary benefit of the invention is the ability to make molded substrates which can employ a micro-pit and land surface structure, or the like, feature on the photon entrance side of the superstrate solar cell with an inverted configuration. A surface structure can also be molded on the surface of the cell nearest to the CIGS absorber layer, for a superstrate solar cell, for more surface area to enhance photon absorption. A cell where photonic energy does not pass through the substrate would only have the ability for an imprinted surface structure on the topside of the polycarbonate substrate.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION OF THE INVENTION

Figure 1:
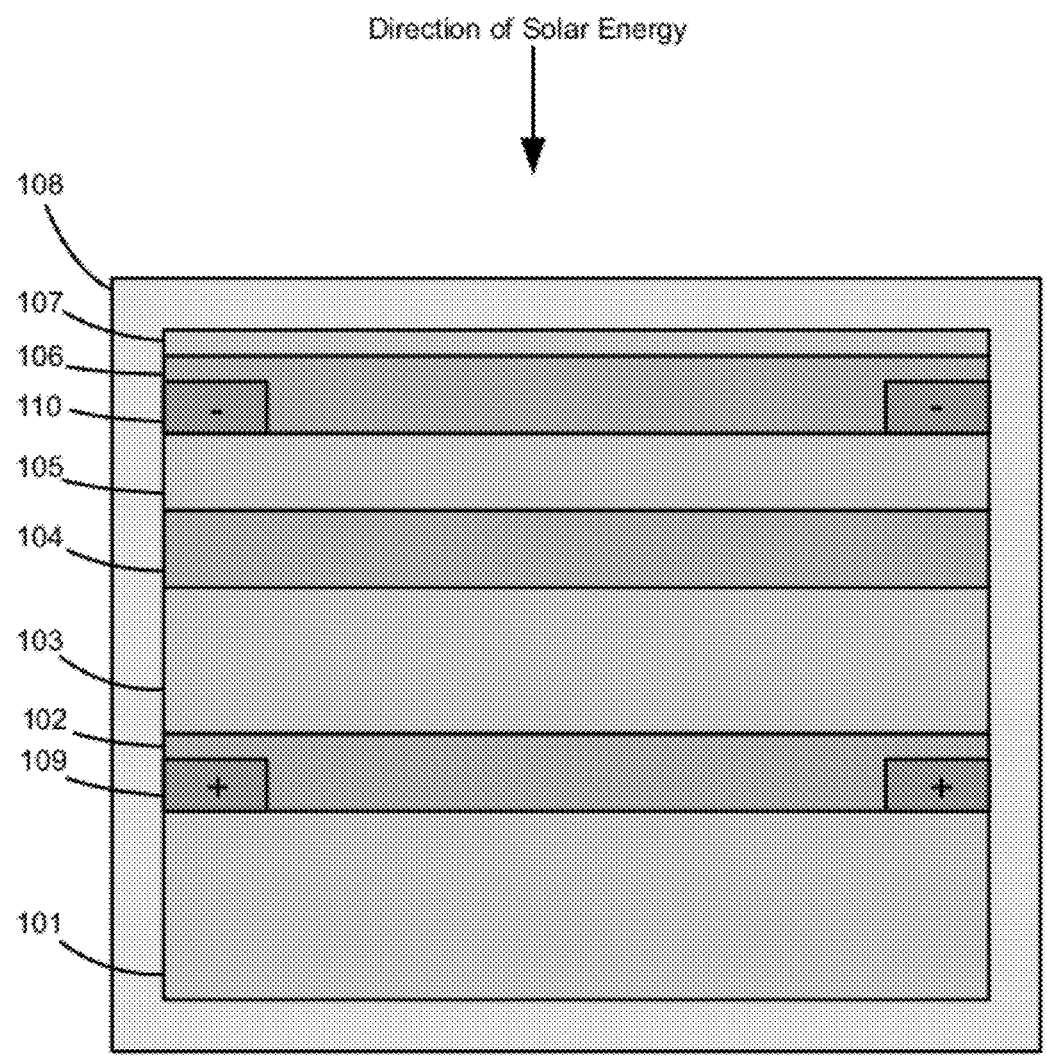
FIG. 1 shows a cross-section view of one possible embodiment of a polycarbonate solar cell.

A high formation temperature has prevented the prevalent use of polycarbonate substrates due to its temperature sensitivity and traditional processes for substrate heating during deposition and/or a reactive gas and heating during selenization/sulfurization that would cause melting of the polycarbonate substrate. Rapid thermal processing technology has advanced to the point that formation of the as-sputtered CIGS layer can be done without heating the substrate or using a high temperature toxic selenization/sulfurization process. In addition, thin-film solar cell material layers require good adhesion to the supporting substrate to provide good functionality with a long service life. A molded polycarbonate substrate can be made to promote excellent adhesion of the initial semiconductor material layers through the use of an imprinted micro-pit and land surface structure that can provide a strong adhesion anchor for the first sputtered material layer. In addition, recent advances in semiconductor thermal processing technology has been the enabler for use of polycarbonate as a solar cell substrate; to the point that it will become common to use the low cost, lightweight and durable polycarbonate solar cell substrates.

The present disclosure describes an apparatus and method for manufacturing polycarbonate substrate solar cells. The apparatus and method utilize concepts developed in the compact and digital versatile disc (CD/DVD) manufacturing industry. Advantages of the apparatus and method over glass substrate manufacturing include a less expensive material handling system, small area vacuum process, more durable product, and a lighter-weight product. Advantages of the apparatus and method over glass, foil, or film substrates include smaller manufacturing space requirements, lower fixed costs, and better quality control. The quality control is better because the apparatus and method use a discrete manufacturing method while glass, foil, or film substrates use a continuous, larger-surface-area manufacturing method.

Previous attempts to manufacture self-supporting polycarbonate substrate solar cells have failed due to the high temperature required for proper formation of the $Cu(In,Ga)Se_2$ (CIGS) absorber layer on the temperature sensitive substrate. Deposition and formation of the CIGS layer typically required temperatures of 400-550 degrees Celsius. Traditional methods used for formation of the CIGS absorber layer during deposition at an elevated temperature by substrate heating or in-situ environment precluded use of polycarbonate substrates or required the process to be done at lower temperatures. However, typical polymer materials such as polycarbonate or temperature resistant polyimide plastic film melt at about 305 degrees Celsius and greater than 400 degrees Celsius respectively. Hence, there is prior art which teaches away from using a temperature sensitive polycarbonate as a substrate in solar cells.

Examples of prior art which teach away from using a polycarbonate as a substrate are:

A. Polyimide films—Polyimide substrate temperature is limited to 400° C. to 450° C. Birkmire et al. 3-2005, "Cu(InGa)Se2 Solar Cells on a Flexible Polymer Web", Institute of Energy Conversion, University of Delaware, Newark, Del. 19716, p 190, 193. Inventor's Note: "Dr. Birkmire is a listed co-author of this paper, he advised me on the phone that using a polycarbonate substrate will never work, and he therefore declined to assist me in making prototypes as it would be a waste of time.", call on Apr. 13, 2009.

B. Eser et al. 9-2005, "Critical Issues for $Cu(InGa)Se_2$ Solar Cells on Flexible Polymer Web", Institute of Energy Conversion, University of Delaware, Newark, Del. 19716. Abstract comment, line 10-11: "In addition, polymer substrates, cannot be used at temperatures that are optimum for Cu(InGa)Se₂ deposition." C. Hoffman et al. July 2000, "Thin-Film Photovoltaic Solar Array Parametric Assessment", NASA/TM-2000-210342, Glenn Research Center, Cleveland, Ohio, AIAA-2000-2919, page 6 (2) Polyimides, or other polymer substrate materials. Hoffman, page 6(2) " . . . cells with moderate efficiency on lightweight substrates can compete on a mass basis, higher cell efficiencies will be required to mitigate impacts associated with large array area. Current thin-film cell fabrication approaches are limited by either (1) the ultimate efficiency that can be achieved with the device material and structure, or (2) the requirement for high temperature deposition processes that are incompatible with all presently known flexible polyimides, or other polymer substrate materials."

The present apparatus and method utilize highly directed energy, such as physical vapor deposition by sputtering, for deposition of a quaternary CIGS precursor metals layer on the substrate at a low temperature to not affect the polycarbonate substrate, and to be followed by rapid heat treatment using a flashlamp, possibly at specific wavelengths, to overcome the limitations of the prior art. The rapid heat treatment of the as-sputtered quaternary CIGS thin-film precursor metal layer consists of using a high intensity pulsed xenon flashlamp, tuned for absorption by the as-sputtered CIGS absorber layer for melting for formation of the absorber layer alloy, of the CIGS metal precursors layer while avoiding the melting of the polycarbonate substrate.

The apparatus and method also enable the use of polycarbonate additives to change the characteristics of the polycarbonate substrate. For example, hollow borosilicate glass spheres may be incorporated into the polycarbonate to lower the overall density of the solar cell. The lower density enables applications where the weight of the solar cell is critical.

The apparatus and method are capable of manufacturing polycarbonate solar cells in any shape required. Examples of shapes include but are not limited to; circular, square, rectangular, trapezoidal, triangular, and oval.

The polycarbonate solar cell will have a topside and an underside. Photonic energy from the sun enters through the topside.

One unexpected result of the apparatus and method is that the product yield can be significantly increased by the discrete process versus an overall scrap rate caused by high speed continuous inline inability to immediately correct substandard production. So, defective product may be isolated and fixed prior to additional steps in the manufacturing process. Also, different portions of the apparatus may be removed from service without affecting other portions of the apparatus.

A cross-section view of one possible embodiment of a polycarbonate solar cell is shown in FIG. 1. The first step is to create a polycarbonate substrate 101 using a polycarbonate molding machine. The following layers, steps two through seven, are added on the topside of the polycarbonate solar cell. The second step is to add a Molybdenum back contact layer 102 with a thickness of 0.9-2 microns. Cathodic (+) contact pads 109 may be deposited on the back contact layer 102. Third, a $CuInGaSe_2$ (CIGS) layer 103 is added with a thickness of 1.0-2.0 microns. The CIGS layer 103 absorbs photonic energy. Fourth, a Cadmium Sulfide (CdS) buffer layer 104 is added with a thickness of 40-60 nanometers. The CdS layer 104 functions as a heterojunction partner buffer. Fifth, an intrinsic-Zinc Oxide (i-ZnO) n-type highly resistive window layer 105 is added with a thickness about 30-50 nm. Sixth, an aluminum doped Zinc Oxide (ZnO:Al) transmissive contact layer 106 is added with a thickness of 0.3-0.5 microns. Anodic (−) bi-layer contacts 110 made of aluminum and nickel are deposited on the transmissive contact layer 106. Seventh, an anti-reflective (AR) coating 107 is added. Finally, the entire solar cell is encapsulated 108 using a technique designed to provide environmental protection and give twenty years of service life.

Figure 2:
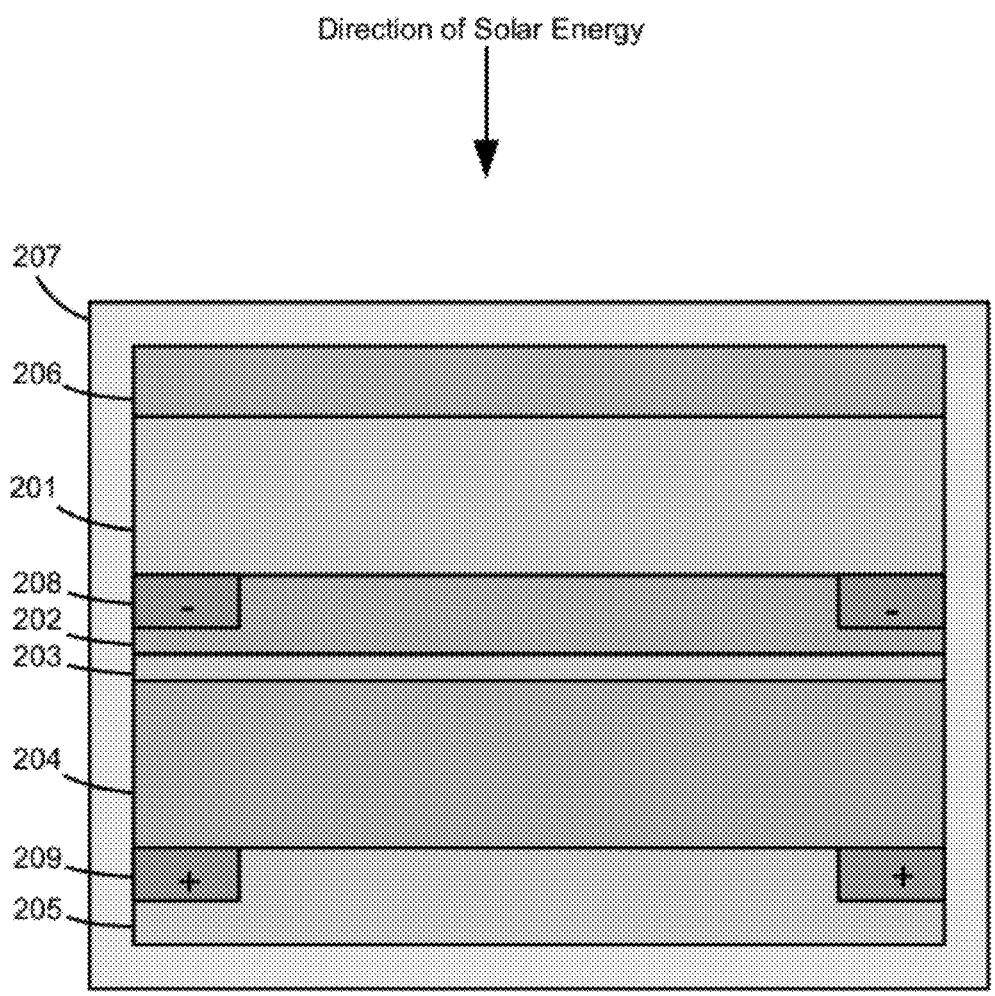
FIG. 2 shows a cross-section view of a second possible embodiment of a polycarbonate solar cell.

A cross-section view of a second possible embodiment of a polycarbonate solar cell is shown in FIG. 2 and called a superstrate due to the inverted configuration with photonic energy entering the polycarbonate substrate compared to FIG. 1. The first step is to create a polycarbonate substrate 201 using a polycarbonate molding machine. Second, a transmissive contact layer 202 is added to the underside with a thickness range of 0.4-2 microns. Anodic (−) bi-layer contact pads 208 made of aluminum, aluminum/nickel, nickel, silver, or the like are deposited on the transmissive contact layer 202. Third, an intrinsic-Zinc Oxide (i-ZnO) n-type highly resistive window layer 203 layer is added to the underside with a thickness of about 0.1 microns. Fourth, a CIGS layer 204 is added to the underside with a thickness of 1.0-2.0 microns. The CIGS layer 204 absorbs photonic energy. Fifth, a highly reflective metal such as gold, silver, or aluminum back contact layer 205 is added to the underside with a thickness of 0.9-1.1 microns. Cathodic (+) contacts 209 are deposited on the back contact layer 205. Sixth, a Magnesium Fluoride (MgF$_2$) anti-reflective coating 206 is added to the topside of the polycarbonate solar cell. Finally, the entire solar cell is encapsulated 207 using a technique designed to provide environmental protection and give twenty years of service life.

Figure 3:
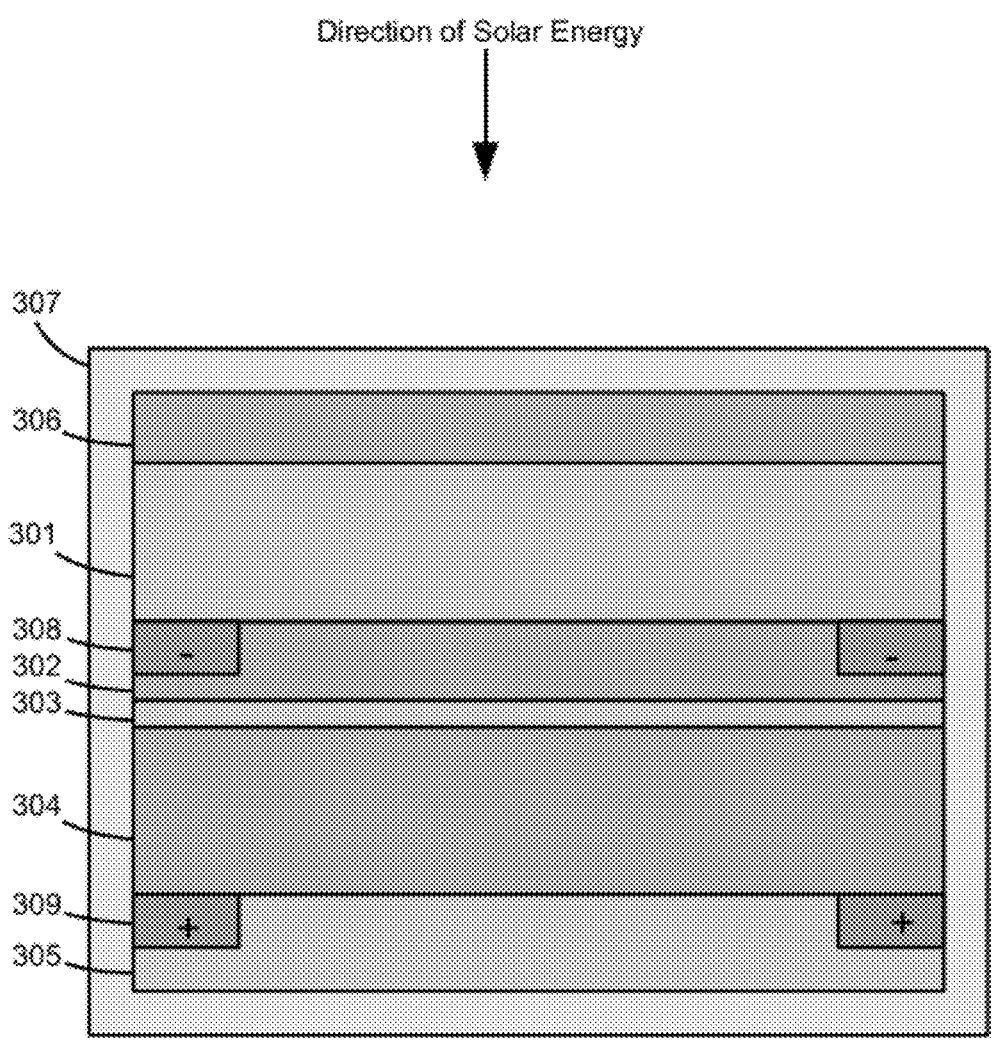
FIG. 3 shows a cross-section view of a third possible embodiment of a polycarbonate solar cell.

A cross-section view of a third possible embodiment of a polycarbonate solar cell is shown in FIG. 3. The first step is to create a polycarbonate substrate 301 using a polycarbonate molding machine. Second, a ZnO or ZnO:Al transmissive conductive layer 302 is added to the underside. Anodic (−) contacts 308 are deposited on the layer 302. Third, a highly resistive intrinsic-ZnO buffer layer 303 is added to the underside. Fourth, a CIGS layer 304 is added to the underside. The CIGS layer 304 absorbs photonic energy. Fifth, a reflective conductive layer 305 is added to the underside. Cathodic (+) contacts 309 are deposited on the reflective conductive layer 305. Sixth, a MgF$_2$ anti-reflective coating 306 is added to the topside. Finally, the entire solar cell is encapsulated 307 using a technique designed to provide environmental protection and give twenty years of service life.

Figure 4:
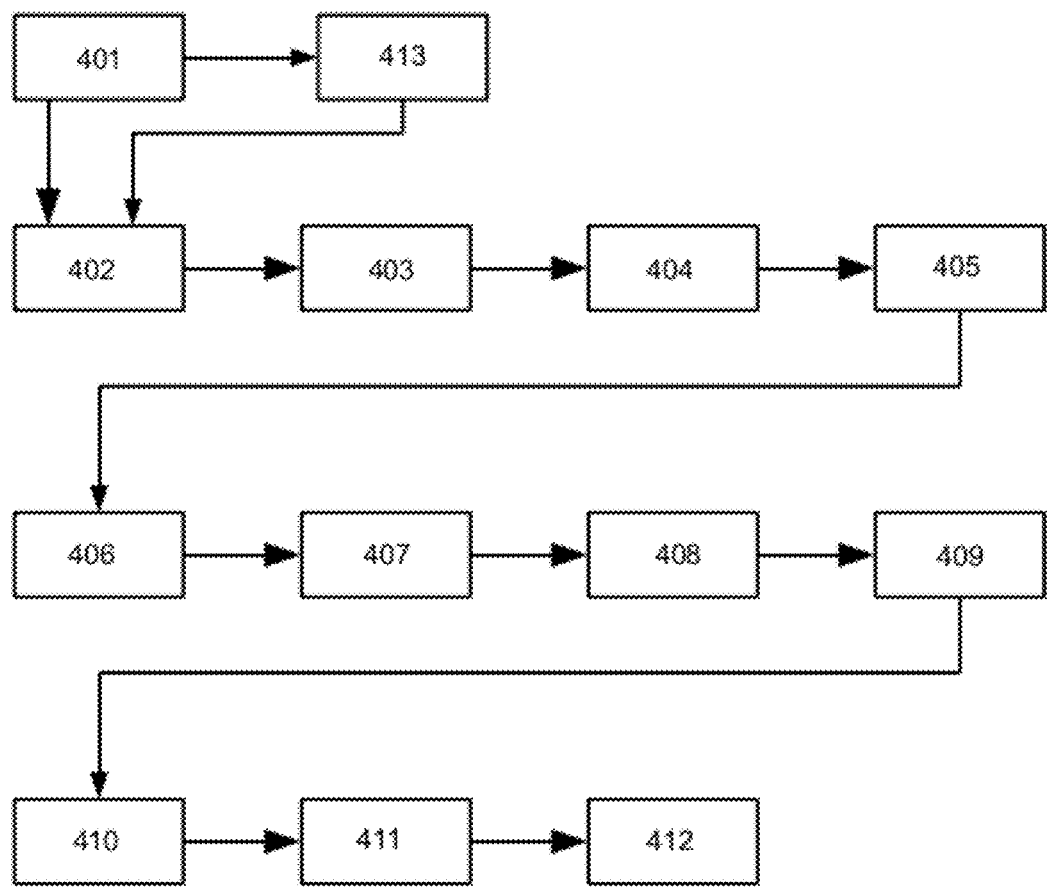
FIG. 4 shows a sequence of steps used to create a polycarbonate solar cell.

FIG. 4 shows a sequence of steps used to create a polycarbonate solar cell. The sequence of steps comprises: creating a polycarbonate substrate for a solar cell with a polycarbonate molding machine 401; storing the substrate in a storage area for subsequent line loading for processing 413; sputtering to deposit a Molybdenum back conductive layer 402 on the substrate, which may come from either step 401 or 413; depositing a p-type CIGS absorber layer 403; using a rapid heat treatment for formation of the CIGS absorber layer 404; depositing a ZnMgO or CdS heterojunction partner buffer layer 405; depositing a highly resistive i-ZnO transmissive n-type layer 406; depositing a transmissive conductive oxide layer (doped ZnO:Al) 407; depositing a first bi-layer of Ni, Ag, or the like for a contact pad 408; depositing a second bi-layer of Al, Ag, or the like for a contact pad 409; placing a MgF$_2$ anti-reflective (AR) coating on the photon entrance side of the solar cell 410; encapsulating the entire solar cell for environmental protection 411; and unload complete substrate from process and storing the completed solar cell substrates in a storage area 412.

Means used to create a polycarbonate substrate for a solar cell with a polycarbonate molding machine comprise: a machine with a mold for the desired substrate shape; a galvanic stamper as used in the CD industry with a selected micro-pit and land surface structure for impressing the molded plastic substrate a desired pattern; a molding machine with correct tonnage to mold the solar cell substrates with a polycarbonate resin material and possible borosilicate hollow glass spheres additive for reduced weight and stronger ultra thin, about 0.4 mm thick, self supporting substrate. Conventionally available polycarbonate molding machines, or the like, capable of creating a polycarbonate substrate for a solar cell are produced by Krauss-Maffei in Germany or Netstal and Singulus Molding in Switzerland.

Means used to store the substrate in a line storage area comprise: a line substrate loader to feed one substrate at a time to the first semiconductor layer process from a stack of injection molded polycarbonate green (unfinished) substrates. The substrate line loader could be connected direct to the polycarbonate molding machine and move the substrate to the first process step or store the substrates until the line is ready to accept the substrates for processing. The substrate storage or loader could be manually loaded with green substrates produced by the injection molding machine at a physically different location.

Means used to sputter deposit a Molybdenum (Mo) conductive layer 1-2 µm thick on the substrate comprise: using DC or RF Magnetron Sputtering with a Mo target in a small vacuum chamber, at argon pressure about 5 microtorr (mT), suited for the shape of the substrate. The sputtering of a thick layer at about 2 µm thickness is for obtaining a dense structure with low resistivity on the order of 12-15 µΩ(cm)$^{-2}$, and with good Mo adhesion to the polycarbonate substrate.

Means used to sputter deposit a quaternary Cu—In—Ga—Se p-type thin-film, or CIGS, absorber layer comprise: sputtering the copper indium gallium diselenide metal precursors in bulk, using a quaternary CIGS sputter target, on the prior sputtered Mo back contact layer in a one step process with deposition of the precursor metals followed by a rapid heat treatment using a high intensity pulsed xenon flashlamp for interdiffusion of selenium nano-particles in the metal layer during melting of the as-sputtered CIGS layer. Deposition by a one step process can be done by using a complete quaternary CIGS target. Deposition for a multi step process can use pulsed DC or RF sputtering target in a vacuum chamber. Typical DC magnetron sputtering conditions are to obtain vacuum at a base pressure about $2\times10^{-7}$ Torr and a working pressure at 1.0-10 mT with argon gas flow. The CIGS sputtering target consists of a selected quaternary CIGS composition for deposition in an argon gas environment.

Means to use a high intensity pulsed xenon flashlamp for rapid heat treatment to form a CIGS absorber layer comprise: using a high intensity pulsed xenon flashlamp for formation of the metal precursors thin film layer. The as-sputtered CIGS material layer must be thermally processed to a melt at about 550° C. to complete the formation of the absorber layer. Selenium particle interdiffusion will occur, with an overpressure, within the melt of the deposited bulk material layer with the quaternary copper, indium, and gallium and selenium. Because selenium has a much higher vapor pressure than copper, indium, or gallium, an overpressure of an inert gas is required during rapid heat treatment process to prevent loss of selenium from the bulk. Semiconductor rapid thermal processing is a high temperature over a very short period of time, or annealing, and includes many known techniques such as; dynamic surface annealing (DSA) to minimize substrate exposure to high temperatures, infrared, flash annealing, tube furnace, laser spike anneal, and/or induction heating, or the like.

Means used to deposit a ZnMgO heterojunction partner buffer layer comprise: deposition of semiconductor material layer by RF magnetron sputtering to about a 30 nm thickness completes the p-n junction of the solar cell, whereas in this disclosure the CIGS absorber layer is of p-type. The buffer layer modifies the CIGS layer surface chemistry and provides beneficial protection during subsequent window layer deposition to complete the solar cell stack. In addition, it is known that ZnMgO as a buffer layer has contributed to obtaining peak conversion efficiencies as discussed in paper by Hariskos et al. 2005, in Thin Solid Films 480-481 (2005) 99-109. ZnMgO also reduces the risk of using the common toxic chemical bath deposition (CBD) of cadmium sulfide (CdS).

Means used to deposit a highly resistive i-ZnO transmissive n-type layer comprise: deposition of the i-ZnO transmissive n-type layer on the ZnMgO buffer layer is done by RF sputtering a 50 nm thick layer in an argon oxygen ambient environment with argon at about 1 mT and oxygen at 0.3 mT.

Means used to deposit a transmissive conductive oxide (TCO) layer (doped Zn—O:Al) or AZO comprise: deposition of aluminum (Al) doped ZnO:Al a transmissive conductive contact layer to about 350 nm thick to obtain a very low sheet resistance (Ω/cm$^2$) using RF or DC magnetron sputtering on the prior intrinsic-ZnO window layer. AZO conductive window layer is typically deposited with 2-4% Al metal incorporated in ZnO. Target power density for deposition is ~3-4

W/cm² with oxygen (O) to argon (Ar) flow rate ~2:1 and an operating pressure ~6 mT. AZO has good transmission in the visible region and usable transmission to IR wavelengths as long as ~2 µm, not reflective and have a cost savings versus a commonly used indium tin oxide (ITO) alternative material per CERAC Inc., a supplier of AZO for solar cells.

Means used to deposit Ni/Al or Ag contact pad/grids comprise: a deposition process by sputtering, evaporation through a mask or recent preferred method using ink jet printing with a fully automated non-contact printing head. Typically used in lab or in industry, the front contacts Ni/Al grids are typically evaporated by e-beam deposition through a mask for a controlled deposition area on the solar cell transmissive conductive oxide layer ZnO:Al. Several commercial sources are now available for ink jet printing the contact/grids on the front conductive window layer of a solar cell.

Means used to place an anti-reflective coating on the photon entrance side of the solar cell comprise: sputter deposition of a 100 nm thick Magnesium fluoride (MgF$_2$) anti-reflection (AR) coating material, or the like, with a MgF2, or the like, ceramic target. Magnesium fluoride is an ideal AR material due to its good light transparency that includes the ultraviolet (UV) range.

Means used to encapsulate the entire solar cell for environmental protection comprise: using a two-part silicone or ethylene vinyl acetate (EVA) film, or the like, to facilitate encapsulation of the complete solar cell for a lasting service life of 20 plus years. The silicone material can be applied by spin-coating or film adhesion process as specified by the manufacturer. EVA is a film that is laminated on the light entrance surface of the solar cell and is not viscid at room temperature, so it can be cut to fit the cell surface prior to lamination system to solidify and have good cell adhesion. The EVA and two-part silicone encapsulants are commercially available as well as the process application equipment.

Means used to store the completed solar cell substrates in a storage area comprise: a process stage to accept complete solar cells from the prior inline station, perform an automated stacking function creating multiple stacks avoiding line stoppage with a continuous line cycle maintained. A full stacking operation would be serviced by operator intervention for inspection audit followed by packaging.

Figure 5:
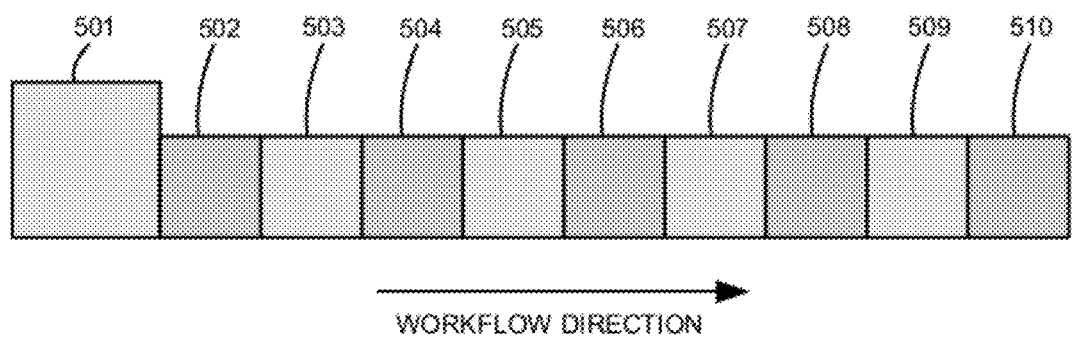
FIG. 5 shows an embodiment of the apparatus used to create a polycarbonate solar cell.

FIG. 5 shows an embodiment of the apparatus used to create a self supporting polycarbonate substrate-based solar cell. Shown in FIG. 5 are: means for creating a polycarbonate substrate for a solar cell with a polycarbonate molding machine 501; means for depositing a cathodic contact layer on the polycarbonate substrate 502; means for depositing a photonic energy absorbing layer on the polycarbonate substrate with directed sputtering energy 503; means to use a high intensity pulsed xenon flashlamp for rapid heat treatment to form a CIGS absorber layer 504; means for depositing a buffer layer on the polycarbonate substrate 505; means for depositing a highly resistive transmissive intrinsic layer by sputtering 506; means for depositing a transmissive contact layer on the polycarbonate substrate 507; means for adding anodic contacts to one of the layers 508; means for depositing an anti-reflective coating layer on the polycarbonate substrate 509; and means for encapsulating the solar cell to provide environmental protection 510.

This apparatus and method will use many techniques that are used to manufacture compact disc media. A blank substrate is molded with a micro-pit structure on one side of the disc for the laser reader. This apparatus and method will provide the capability to preprogram a micro-pit and land structure for obtaining good adhesion, and lower resistivity, of the initial sputtered metal layer with more surface area for the CIGS absorption layer. The blank substrate is moved by robotics or other mechanical automation for application of the necessary layers by sputtering or spin coating. The solar cell will require sputtering of the transparent conductor layer, buffer layer, CIGS absorber layer, highly reflective conductive underside, and anti-reflective layer. The encapsulation of the complete cell can be done by a conventional spin coating or protective film layer. Electrical contact points can be added by a conventional method such as sputtering, etching, or printing.

A primary benefit of the invention is the ability to make molded substrates which can employ a micro-pit and land, or the like, feature on the photon entrance side (FIG. 2) of a superstrate solar cell with an inverted configuration. A micro-pit surface can also be molded on the surface of the cell nearest to the CIGS absorber layer, opposite the photonic energy entrance side for a superstrate solar cell, for more surface area to enhance photon absorption. A cell where photonic energy does not pass through the substrate (FIG. 1) would only have the ability for a micro-pit and land surface on the topside of the polycarbonate substrate.

For the purposes of this disclosure, compact disc recorded data consists of a series of pits imprinted in the surface, separated by lands, during the molding process by a pre-mastered galvanic stamper. Each pit is approximately 100 nanometers deep by 500 nanometers wide and varies from 850-3500 nanometers in length. In addition, there is a spiral track from inside moving out to the outer edge of the molded disc, in the stamper to be imprinted on the surface at the same time of the pit imprinting. The spacing between the tracks is 1.6 microns. The laser reader on a CD/DVD/BlueRay follows the spiral and reads the pit/land data encoded.

For the purposes of this disclosure, pulsed xenon flashlamps have a broad spectrum from 240-1,000 nanometers, an adjustable pulse energy from 150-2,000 joules per pulse, and an adjustable pulse duration of 580-2,000 microseconds. The speed and low substrate heating (due to the wavelength being used) permits high peak power delivery of the compressed energy over a short duration. Peak power phenomenon results in greater absorption into the as-sputtered CIGS material layer for formation. Short pulses of light minimize heating. Technology in pulsed xenon flashlamps offer control of pulse width, wavelength selection for absorption, and physical size of the lamp for the application.

While the disclosure describes embodiments and various alternatives thereto, it should be apparent that the invention is not limited to such embodiments. Rather, many variations would be apparent to persons of skill in the art without departing from the scope and spirit of the invention.

I claim:

1. An apparatus for manufacturing a solar cell on polycarbonate substrate, which comprises:

means for creating a polycarbonate substrate for a solar cell;

means for depositing a low resistivity cathodic contact layer on the polycarbonate substrate;

a sputter chamber comprising a quaternary CIGS sputter target;

a modulated high intensity pulsed xenon flashlamp;

means for depositing a buffer layer;

means for depositing a highly resistive transmissive intrinsic layer on the buffer layer;

means for depositing a transmissive contact oxide window layer on the highly resistive transmissive intrinsic layer;

means for adding anodic contacts to one of the layers;

means for depositing an anti-reflective coating layer on one of the layers; and means for encapsulating the solar cell to provide environmental protection.

2. The apparatus of claim 1, wherein the polycarbonate substrate contains high strength microscopic borosilicate hollow spheres.

3. The apparatus of claim 2, wherein the polycarbonate substrate has micro-pit and land surface structure.

4. The apparatus of claim 1, further comprising means for imprinting a programmable micro-pit and land surface feature on the polycarbonate solar cell substrate.

\* \* \* \* \*